US010100648B2

(12) United States Patent
Niezelski et al.

(10) Patent No.: US 10,100,648 B2
(45) Date of Patent: Oct. 16, 2018

(54) DAMPER SEAL INSTALLATION FEATURES

(71) Applicant: United Technologies Corporation, Hartford, CT (US)

(72) Inventors: David A. Niezelski, Manchester, CT (US); Joshua D. Winn, Ellington, CT (US); Jeffrey S. Beattie, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 517 days.

(21) Appl. No.: 14/961,395

(22) Filed: Dec. 7, 2015

(65) Prior Publication Data

US 2017/0159457 A1 Jun. 8, 2017

(51) Int. Cl.
*F01D 5/22* (2006.01)
*F01D 5/26* (2006.01)
*F01D 5/30* (2006.01)
*F01D 11/00* (2006.01)
*F16F 15/04* (2006.01)

(52) U.S. Cl.
CPC .............. *F01D 5/22* (2013.01); *F01D 5/26* (2013.01); *F01D 5/30* (2013.01); *F01D 5/3007* (2013.01); *F01D 11/006* (2013.01); *F16F 15/04* (2013.01); *F05D 2240/30* (2013.01); *F05D 2240/55* (2013.01); *F05D 2260/96* (2013.01)

(58) Field of Classification Search
CPC . F01D 5/22; F01D 5/3007; F01D 5/26; F01D 5/30; F01D 11/006; F16F 15/04; F05D 2240/30; F05D 2240/55; F05D 2260/96
See application file for complete search history.

(56) References Cited

U.S. PATENT DOCUMENTS

| | | | |
|---|---|---|---|
| 3,381,601 A | 5/1968 | McCabe | |
| 4,872,812 A | 10/1989 | Hendley | |
| 5,281,097 A | 1/1994 | Wilson et al. | |
| 5,478,207 A * | 12/1995 | Stec | F01D 5/22 416/219 R |
| 5,573,375 A | 11/1996 | Barcza | |
| 5,746,578 A | 5/1998 | Brassfield | |
| 5,785,499 A | 7/1998 | Houston | |
| 5,803,710 A * | 9/1998 | Dietrich | F01D 5/22 416/248 |
| 5,827,047 A | 10/1998 | Gonsor et al. | |
| 5,924,699 A * | 7/1999 | Airey | F01D 11/008 277/411 |
| 6,171,058 B1 | 1/2001 | Stec | |
| 7,445,212 B2 | 11/2008 | Gail | |
| 2006/0056974 A1 | 3/2006 | Beattie | |

(Continued)

OTHER PUBLICATIONS

EP search report for EP16202769.2 dated May 24, 2017.
Jeff Fuchs, "Manufacturing Insights: Poke-Yoke: Mistake Proofing", Society of Manufacturing Engineers, 2008.

*Primary Examiner* — Igor Kershteyn
(74) *Attorney, Agent, or Firm* — O'Shea Getz P.C.

(57) ABSTRACT

Aspects of the disclosure are directed to a damper configured to be located in a cavity formed between first and second bases configured to seat respective first and second airfoils, the damper having a first face and a second face, where an aspect ratio between the first face and the second face ensures that the damper is installed in the cavity in accordance with a predetermined orientation.

13 Claims, 6 Drawing Sheets

(56) References Cited

U.S. PATENT DOCUMENTS

| | | |
|---|---|---|
| 2013/0195665 A1 | 8/2013 | Snyder et al. |
| 2014/0003950 A1 | 1/2014 | Beattie |
| 2014/0223920 A1 | 8/2014 | Stevens |
| 2015/0240724 A1 | 8/2015 | Low |
| 2016/0102557 A1 | 4/2016 | Knowlton et al. |

* cited by examiner

DAMPER SEAL INSTALLATION FEATURES

BACKGROUND

Seals are used in aircraft engines to isolate a fluid from one or more areas/regions of the engine. For example, seals are used to control various characteristics (e.g., temperature, pressure) within the areas/regions of the engine and can be useful to ensure proper/efficient engine operation and stability. Seals can also provide a dampening function to reduce the impact of vibration on a component of the engine and are referred to as dampers or damper devices.

Dampers are susceptible to incorrect installation, which can result in suboptimal dampening or suboptimal sealing. To address this, keyed features have been incorporated into the component of the engine in an effort to preclude incorrect installation of a damper. However, the introduction of such keyed features can result in localized, elevated stress concentrations in the component and detract from the performance of the component in terms of, e.g., aerodynamics.

What is needed is a "mistake-proof" design for a damper/seal that is less susceptible to improper installation without degrading engine performance/efficiency.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a damper configured to be located in a cavity formed between first and second bases configured to seat respective first and second airfoils, the damper having a first face and a second face, where an aspect ratio between the first face and the second face ensures that the damper is installed in the cavity in accordance with a predetermined orientation. In some embodiments, the first face has a first width and the second face has a second width that is different from the first width, and the aspect ratio is based on a ratio of the first width and the second width. In some embodiments, the first width and the second width are measured with respect to a centerline that runs a length of the damper. In some embodiments, the damper has a bridge section that joins the first face and the second face. In some embodiments, a width of the bridge section is less than a first width associated with the first face and a second width associated with the second face. In some embodiments, the damper is substantially U-shaped. In some embodiments, the damper is made of a sheet stock. In some embodiments, the damper is configured to be rotated in a first direction to get the first face to fit in the cavity. In some embodiments, the damper is configured to be counter-rotated relative to the first direction to seat the damper within the cavity. In some embodiments, the system further comprises the first and second bases. In some embodiments, the system further comprises the first and second airfoils. In some embodiments, the first and second airfoils are associated with blades of a turbine. In some embodiments, the system further comprises a rotor disk configured to seat the first and second bases. In some embodiments, the predetermined orientation is relative to a forward reference direction or an aft reference direction.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
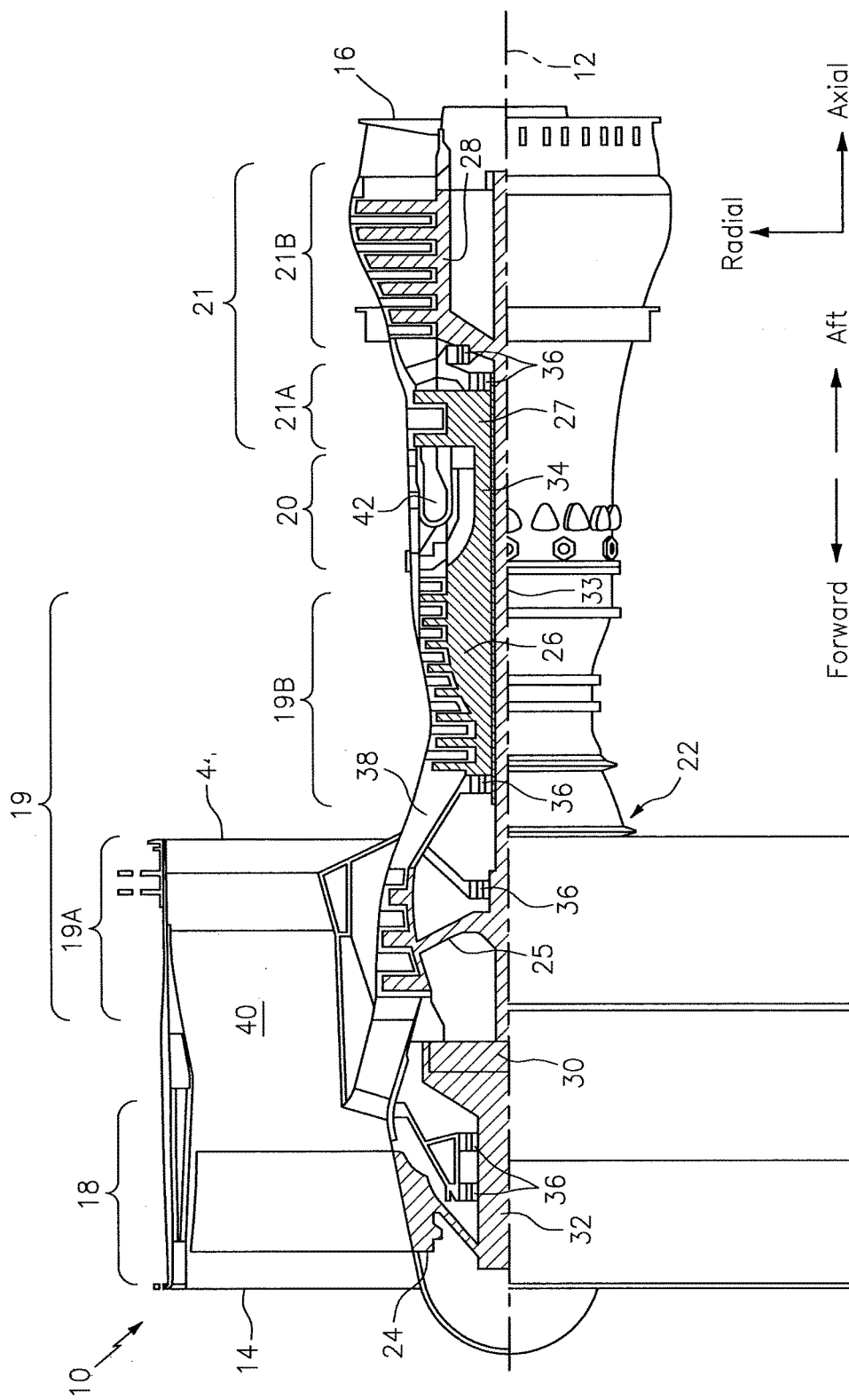
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described in connection with a damper and damper design for an engine. In some embodiments, the damper is manufactured/fabricated to include one or more features to ensure that the damper is installed correctly, thereby facilitating a so-called "mistake-proof" assembly procedure.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2:
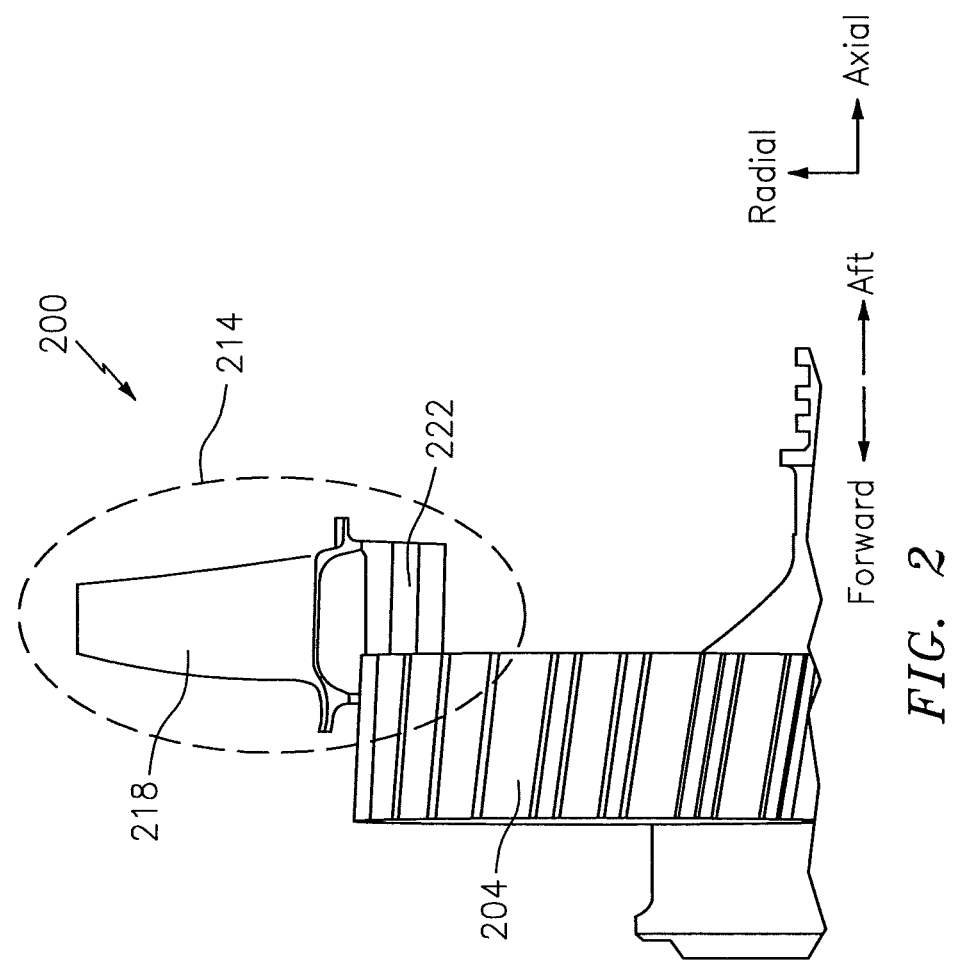
FIG. 2 illustrates an installation of a blade assembly into a disk in accordance with aspect of the disclosure.

Referring now to FIG. 2, a system 200 is shown. The system 200 may be included as part of an engine. The system 200 may be incorporated as part of one or more sections of the engine, such as for example the turbine section 21 of the engine 10 of FIG. 1.

The system 200 may include a disk/hub 204. The disk 204 may form part of a rotor, although it is understood that aspects of the system 200 may be applied to a stator/stationary structure. A blade assembly 214 may be coupled to (e.g., inserted into) the disk 204. The blade assembly 214 may include an airfoil/blade 218 and a base 222 configured to seat the airfoil 218. The airfoil 218 and the base 222 may be manufactured as a single monolithic piece or may be fabricated separately and then coupled together using one or more techniques (e.g., brazing, welding, application of one or more adhesives, etc.). The base 222 may include a "fir tree" design geometry to support insertion of the blade assembly 214 into the disk 204.

In the embodiment of FIG. 2, the blade assembly 214 is shown as being inserted into the disk 204 in an aft-to-forward direction. In some embodiments, the insertion of the blade assembly 214 may occur in a forward-to-aft direction. One of skill in the art would appreciate that removal of the blade assembly 214 from the disk 204 may occur in a direction that is opposite of whatever insertion direction is used. In some embodiments, the base 222 and/or the disk 204 may be keyed to support insertion of the base 222 into the disk 204 in only a single direction.

While the embodiment of FIG. 2 illustrates a single blade assembly 214 for ease of explanation, when an engine is fully assembled more than one blade assembly 214 is frequently included. For example, multiple blade assemblies 214 may be included, where each blade assembly 214 may consume a portion of a circumference of the disk 204.

Figure 3:
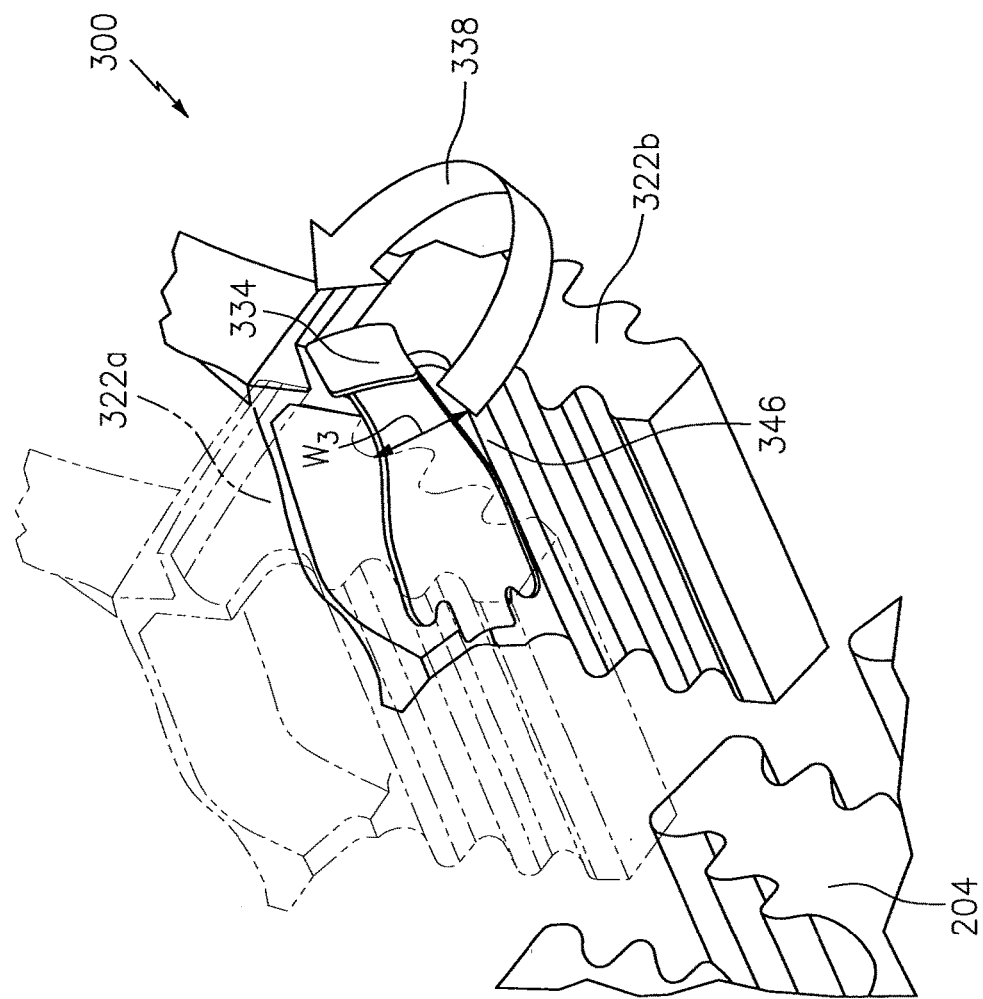
FIG. 3 illustrates, from an aft-to-forward reference direction perspective, a system incorporating at least two blade assemblies and a damper located between respective bases of the at least two blade assemblies, where the damper is installed correctly.

Referring to FIG. 3, a system 300 including two blade assemblies is shown. In particular, a first base 322a of a first blade assembly is shown as being positioned proximate a second base 322b of a second blade assembly. For purposes of clarity in illustration, the bases 322a and 322b are shown as being decoupled from the disk 204 in FIG. 3.

The system 300 may include a damper 334. The damper 334 may be made of one or more materials, such as for example a sheet stock. Arrow 338 indicates that a rotation/twisting of the damper 334 may be provided to get a notional leading or forward-most face 442 (see FIG. 4A) of the damper 334 to initially fit in a cavity 346 formed between the bases 322a and 322b. A counter-rotation (relative to the rotation direction 338) may then be provided to fully seat the damper 334 within the cavity 346.

Figure 4A:
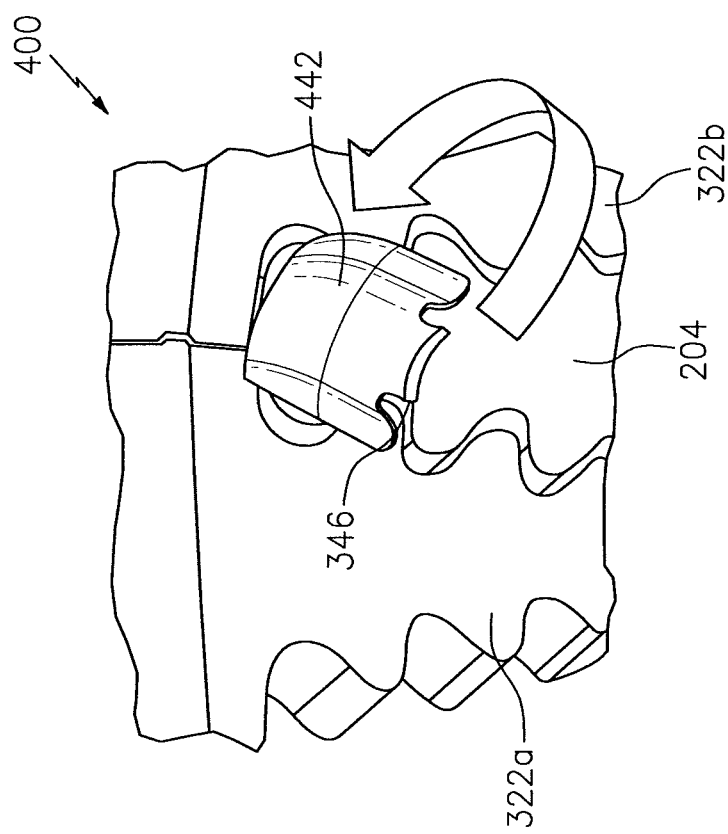
FIG. 4A-4B illustrate, from an aft-to-forward reference direction perspective, a system incorporating at least two blade assemblies and a damper located between respective bases of the at least two blade assemblies, where the damper is installed incorrectly.
Figure 4B:
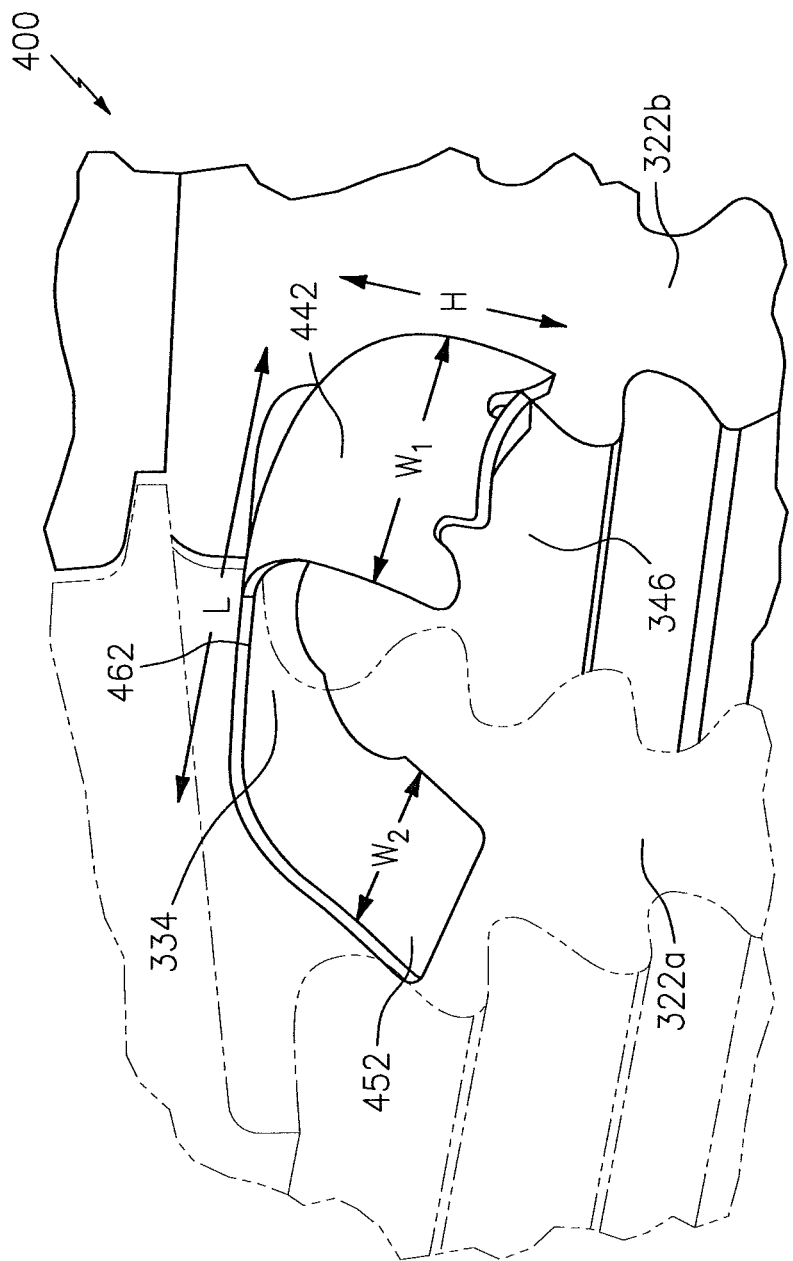

FIG. 3 illustrates an embodiment/scenario where the damper 334 is installed correctly or with a proper orientation. In contrast thereto, FIGS. 4A-4B illustrate an embodiment/scenario where the damper 334 is installed incorrectly (e.g., backwards). For example, and referring to the system 400 shown in FIG. 4A, the notional leading or forward-most face 442 of the damper 334 is shown as appearing towards the aft-most portion of the disk 204 due to the incorrect installation. An area of the face 442 is larger than the (aft-most) area of the cavity 346 created between the bases 322a and 322b, such that the face 442 may prevent the damper 334 from sliding/translating fully in the forward direction. Referring to FIG. 4B, what was notionally a trailing or aft-most face 452 of the damper 334 is shown as appearing substantially forward within the cavity 346 due to the incorrect installation.

Figure 5:
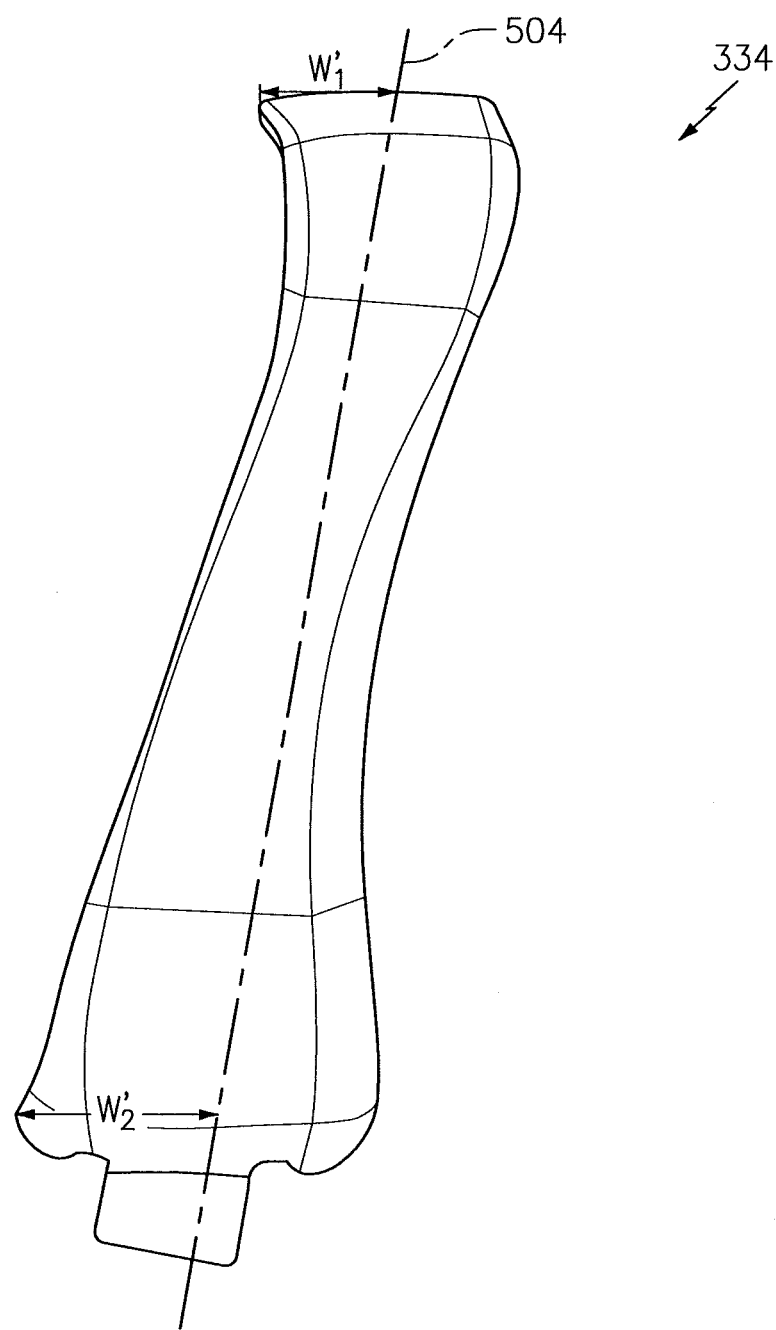
FIG. 5 illustrates the damper of FIG. 3 with one or more dimensions measured relative to a centerline.

In accordance with aspects of the disclosure, an aspect ratio may be defined as a ratio between a first area or dimension and a second area or dimension. Referring to FIG. 4B, the leading face 442 may have a first width $W_1$ and the trailing face 452 may have a second width $W_2$. Referring to FIG. 5, the damper 334 is shown/measured with respect to a reference centerline 504 that runs along a length/span 'L' of the damper 334 (see also FIG. 4B). In FIG. 5, a first width $W_1'$ and a second width $W_2'$ are shown relative to the centerline 504. The widths $W_1'$ and $W_2'$ of FIG. 5 may be half of the widths $W_1$ and $W_2$ of FIG. 4B, respectively. The widths $W_1'$ and $W_2'$ may be measured at the faces 442 and 452, respectively.

An aspect ratio between the widths $W_1'$ and $W_2'$ may be expressed as $W_1'/W_2'$. This ratio may be less than one, e.g., $W_2'$ may be larger than $W_1'$. However, in some embodiments the width $W_2'$ may be less than the width $W_1'$.

The damper 334 may include a bridge section 462 that joins the faces 442 and 452. Referring to FIG. 3, the bridge section 462 may have a width $W_3$. The width $W_3$ may be different from (e.g., less than) one or both of the widths $W_1$ and $W_2$.

The damper 334 may have a height 'H' as shown in FIG. 4B. While illustrated as a single height, in some embodiments the damper 334 may have multiple associated heights (e.g., a first height associated with the face 442 and a second height associated with the face 452). Still further, the damper 334 may have an associated length 'L', which is shown in FIG. 4B as being measured between the face 442 and the face 452.

As shown in the drawings, the damper 334 may be substantially U-shaped. The particular shape or dimensions that are used for the damper 334 may be selected to mimic the shape or dimensions associated with the cavity 346.

As reflected via the description above associated with FIGS. 3 and 4A-4B, a damper may include one or more features that may indicate when the damper is potentially being installed incorrectly (e.g., with an improper orientation). Such features may serve to facilitate a mistake-proof assembly by alerting a technician/mechanic/operator as to the existence of an incorrect installation. In this manner, the damper may be located within a cavity in accordance with a predetermined, correct orientation (e.g., as measured relative to a forward or an aft reference direction).

Technical effects and benefits of this disclosure include enhanced confidence in the assembly of an engine. For example, aspects of the disclosure may include a damper that is dimensioned to prevent incorrect installation of the damper within a cavity formed between blade assemblies.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system for a gas turbine engine, comprising:
a damper configured to be located in a cavity formed between first and second bases configured to seat respective first and second airfoils, the damper having a first face and a second face,
wherein an aspect ratio between the first face and the second face ensures that the damper is installed in the cavity in accordance with a predetermined orientation, wherein the predetermined orientation is relative to a forward axial reference direction or an aft axial reference direction with respect to an axial centerline of the gas turbine engine.

2. The system of claim 1, wherein the first face has a first width and the second face has a second width that is different from the first width, and wherein the aspect ratio is based on a ratio of the first width and the second width.

3. The system of claim 2, wherein the first width and the second width are measured with respect to a centerline that runs a length of the damper.

4. The system of claim 1, wherein the damper has a bridge section that joins the first face and the second face.

5. The system of claim 4, wherein a width of the bridge section is less than a first width associated with the first face and a second width associated with the second face.

6. The system of claim 4, wherein the damper is substantially U-shaped.

7. The system of claim 1, wherein the damper is made of a sheet stock.

8. The system of claim 1, wherein the damper is configured to be rotated in a first direction to get the first face to fit in the cavity.

9. The system of claim 8, wherein the damper is configured to be counter-rotated relative to the first direction to seat the damper within the cavity.

10. The system of claim 1, further comprising:
the first and second bases.

11. The system of claim 10, further comprising:
the first and second airfoils.

12. The system of claim 1, wherein the first and second airfoils are associated with blades of a turbine.

13. The system of claim 12, further comprising:
a rotor disk configured to seat the first and second bases.

* * * * *